(12) United States Patent
Enache

(10) Patent No.: US 6,886,642 B2
(45) Date of Patent: May 3, 2005

(54) WEEDING APPARATUS

(76) Inventor: Tudor Enache, 5208 - 105A Avenue N.W., Edmonton, Alberta (CA), T6A 1C4

( * ) Notice: Subject to any disclaimer, the term of this patent is extended or adjusted under 35 U.S.C. 154(b) by 0 days.

(21) Appl. No.: 10/299,571

(22) Filed: Nov. 18, 2002

(65) Prior Publication Data

US 2003/0094291 A1 May 22, 2003

(30) Foreign Application Priority Data

Nov. 21, 2001 (CA) ................................ 2363433

(51) Int. Cl.$^7$ ................................................ A01B 1/00
(52) U.S. Cl. ...................... 172/371; 172/19; 172/13; 111/92; 30/314
(58) Field of Search ...................... 172/371, 322, 172/19, 13; 111/92, 95; D8/1, 7, 10, 12; 30/314, 223, 225.4, 320

(56) References Cited

U.S. PATENT DOCUMENTS

| 1,419,987 | A | * | 6/1922 | Muthart | ........................ | 294/50 |
|---|---|---|---|---|---|---|
| 1,501,965 | A | * | 7/1924 | Moors | ........................ | 294/50.5 |
| 2,504,746 | A | * | 4/1950 | Stecker et al. | ............... | 254/132 |
| 2,610,397 | A | * | 9/1952 | Sutton | ........................ | 30/124 |
| 2,729,493 | A | * | 1/1956 | Engel | ........................ | 111/101 |
| 2,769,385 | A | * | 11/1956 | Hahn | ........................ | 172/360 |
| 2,814,875 | A | * | 12/1957 | Goodson | .................... | 30/315 |
| 2,855,668 | A | * | 10/1958 | Ottenad et al. | ................ | 30/276 |
| 3,156,304 | A | * | 11/1964 | Lawrence | ...................... | 172/18 |
| 3,608,644 | A | * | 9/1971 | Ambrose | ...................... | 172/378 |
| 3,680,639 | A | * | 8/1972 | Davis | ........................... | 172/15 |
| 3,927,721 | A | * | 12/1975 | Coppock | ...................... | 172/371 |
| 4,243,206 | A | * | 1/1981 | Heikkinen et al. | .......... | 254/132 |
| 4,603,744 | A | * | 8/1986 | Ramirez | ....................... | 172/25 |
| 4,832,132 | A | * | 5/1989 | Barcelon | ..................... | 172/371 |
| 4,964,472 | A | * | 10/1990 | Cleworth | ..................... | 171/11 |
| 5,375,401 | A | * | 12/1994 | Flickinger | .................... | 56/239 |
| 5,402,853 | A | * | 4/1995 | Tauber | ........................ | 172/378 |
| 5,535,833 | A | | 7/1996 | Mathews | ...................... | 172/371 |
| 5,609,325 | A | | 3/1997 | DeArmond | ................. | 254/132 |
| 5,615,744 | A | | 4/1997 | Krafka | ......................... | 172/22 |
| 5,730,226 | A | * | 3/1998 | Kendall | ....................... | 172/378 |
| 5,842,331 | A | | 12/1998 | Klee | ........................... | 56/16.9 |
| 5,865,259 | A | | 2/1999 | Catto | ........................... | 172/25 |
| 5,960,891 | A | | 10/1999 | Sheehan et al. | ............. | 172/381 |
| 6,016,876 | A | * | 1/2000 | Rountree et al. | ............. | 172/378 |
| 6,056,068 | A | | 5/2000 | O'Callaghan | ................ | 172/378 |
| 6,257,346 | B1 | * | 7/2001 | Schofield et al. | ............ | 172/381 |

* cited by examiner

Primary Examiner—Robert E. Pezzuto
Assistant Examiner—Thomas A Beach
(74) Attorney, Agent, or Firm—Christensen O'Connor Johnson Kindness PLLC

(57) ABSTRACT

A weeding apparatus includes a body having a bottom and a blade angularly positioned within the body. The blade is movable between an extended position and a retracted position. In the extended position the blade protrudes at an angle past the bottom of the body. A plunger is used to move the blade from the retracted to the extended position.

6 Claims, 2 Drawing Sheets

WEEDING APPARATUS

FIELD OF THE INVENTION

The present invention relates to a weeding apparatus and, in particular, a weeding apparatus intended for mono-root weeds, such as dandelions.

BACKGROUND OF THE INVENTION

Many weeding apparatus developed for mono-root weeds cut off that portion of a weed which is visible above ground, leaving the root of the weed in its entirety below ground. Such weeding apparatus are frequently ineffective, as the weed tends to regenerate.

Other weeding apparatus extracts the weed and a plug of soil which includes a large portion of the root. Such weeding apparatus leave holes in the ground where the plug of soil was removed in the process of removing the weed.

SUMMARY OF THE INVENTION

The present invention relates to an alternative form of weeding apparatus.

According to the present invention there is provided a weeding apparatus which includes a body having a bottom and a blade angularly positioned within the body. The blade is movable between an extended position and a retracted position. In the extended position the blade protrudes at an angle past the bottom of the body. Means is provided for moving the blade from the retracted to the extended position.

The weeding apparatus, as described above, overcomes the disadvantages of prior art weeding apparatus. As the blade extends from the bottom of the body at an angle, the root of the weed is severed below ground.

In order to survive, plants require a vital flow of nutrients to pass through the root and stem to the leaves. This tool is based upon the premise that interrupting this vital flow of nutrients will result in the death of the plant. There is no need to remove any portion of the weed from the ground.

Although beneficial results may be obtained through the use of the weeding apparatus, as described above, a blade that is sharp enough to penetrate the ground and sever a root of a weed presents a potential safety hazard. Even more beneficial results may, therefore, be obtained when a spring is provided which biases the blade into the retracted position, such that the biasing force of the spring must be overcome in order to move the blade to the extended position.

Although beneficial results may be obtained through the use of the weeding apparatus, as described above, the preferred means for moving the blade from the retracted to the extended position is a plunger which protrudes from the body. The plunger engages the blade, such that an axial force exerted upon the plunger is transmitted to the blade causing the blade to move from the retracted position to the extended position. The plunger may be designed to be activated by a person's hand or by a person's foot.

Although beneficial results may be obtained through the use of the weeding apparatus, as described above, it is preferred that the blade be oriented at an angle of between 30 degrees and 60 degrees in relation to the bottom of the body. The optimum angle is considered to be approximately 45 degrees. When the angle is less than 30 degrees the blade penetrates the ground at a shallow angle and cuts the root of the weed too close to the surface. When the angle is greater than 60 degrees, the blade must penetrate too deeply into the soil to encounter the root of the weed.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
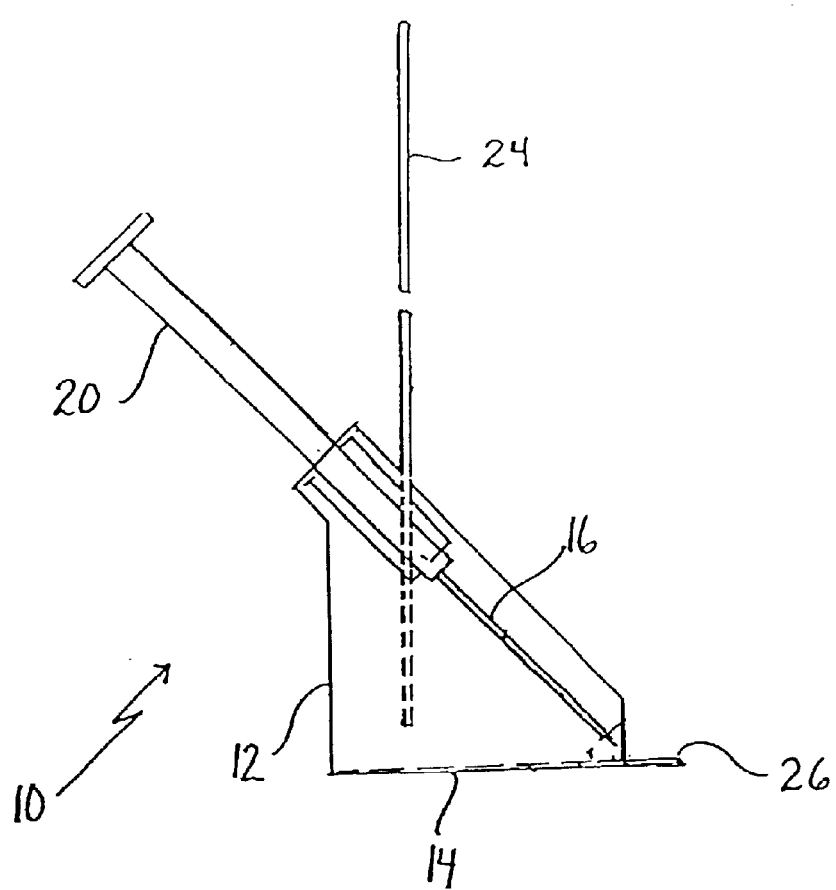
FIG. 1 is a side elevation view, in section, of a weeding apparatus constructed in accordance with the teachings of the present invention, with blade in a retracted position.

The preferred embodiment, a weeding apparatus generally identified by reference numeral 10, will now be described with reference to FIGS. 1 through 4.

Figure 2:
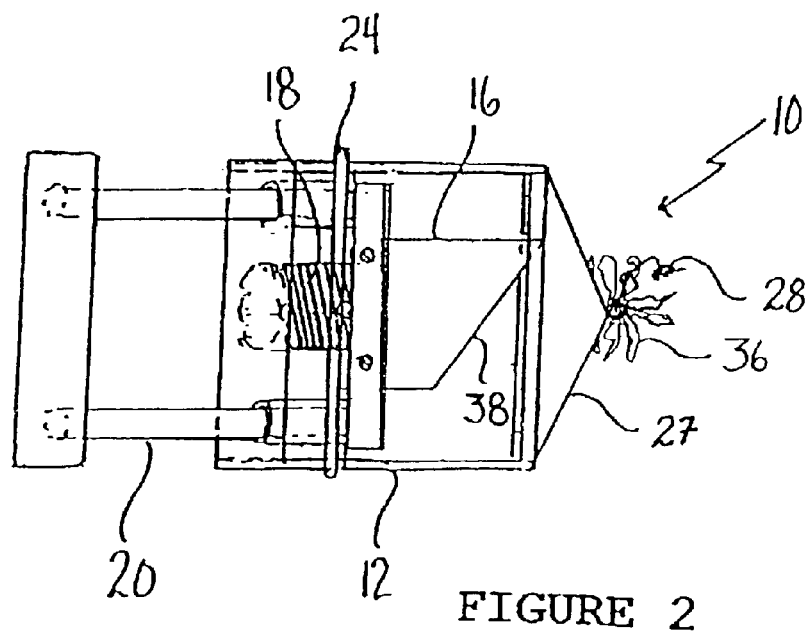
FIG. 2 is a top plan view of the weeding apparatus illustrated in FIG. 1.
Figure 3:
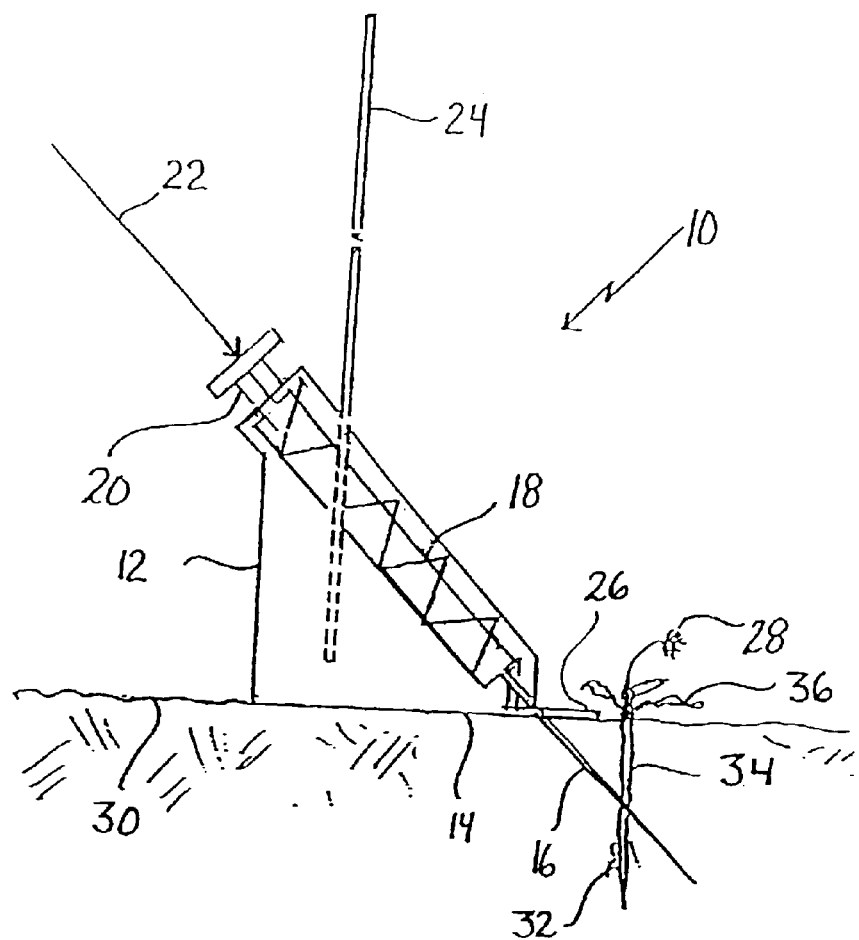
FIG. 3 is a side elevation view, in section, of the weeding apparatus illustrated in FIG. 1, with blade in an extended position.
Figure 4:
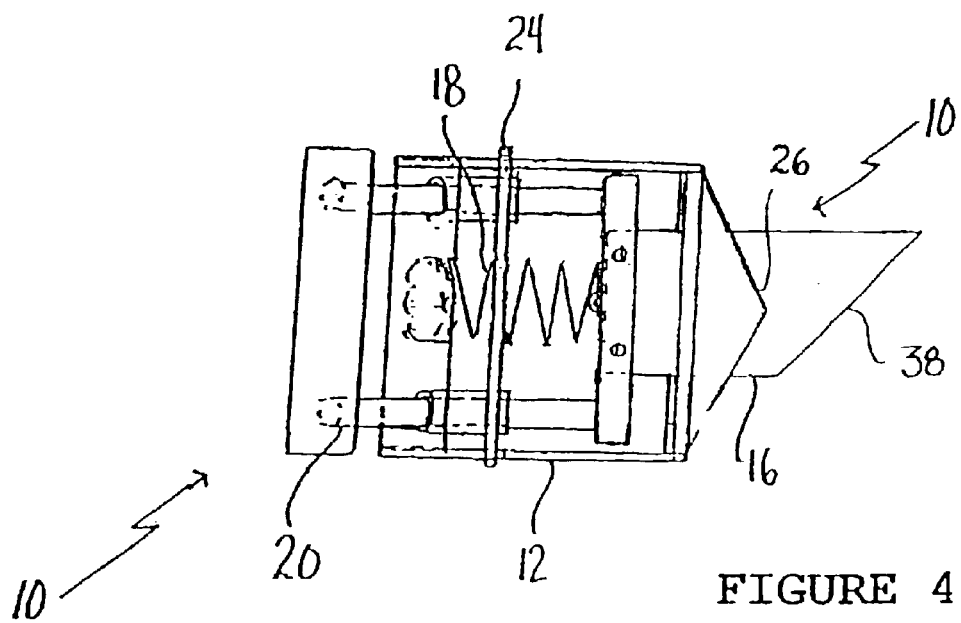
FIG. 4 is a top plan view of the weeding apparatus illustrated in FIG. 3.

Structure and Relationship of Parts:

Referring to FIG. 1, there is provided a weeding apparatus 10 which includes a body 12 with a planar bottom 14. A blade 16 is angularly positioned within body 12 at an angle of between 30 degrees and 60 degrees in relation to bottom 14 of body 12, with the preferred angle being 45 degrees. Referring to FIGS. 1 and 3, blade 16 is movable between an extended position and a retracted position. Referring Lo FIG. 3, in the extended position, blade 16 protrudes at an angle past bottom 14 of body 12. Referring to FIG. 2, a spring 18 biases blade 16 into the retracted position, such that the biasing force of spring 18 must be overcome in order to move blade 16 to the extended position as illustrated in FIG. 1. Referring to FIG. 4, a plunger 20 protrudes from body 12 for moving blade 16 from the retracted to the extended position. Referring to FIG. 3, plunger 20 engages blade 16, such that an axial force 22 exerted upon plunger 20 is transmitted to blade 16 causing blade 16 to move from the retracted position to the extended position.

In the illustrated embodiment, body 12 has an upwardly extending handle 24 which can be adjusted to suit the height of a user, however it will be appreciated that other configurations of handles could be used.

Body 12 also has a pointer 26 to facilitate positioning body 12 relative to a weed 28, so that the blade will sever a root of the weed when moved to the extended position.

Operation:

The use and operation of weeding apparatus generally identified by reference numeral 10, will now be described with reference to FIGS. 1 through 4. Referring to FIGS. 1 and 3, in order to use apparatus 10 for weeding, body 12 of apparatus 10 is positioned with bottom 14 placed on ground 30 and pointer 26 pointing to a weed 28. Referring to FIG. 3, when apparatus 10 is properly positioned with pointer 26 pointing to weed 28, axial force 22 is exerted upon plunger 20 which is transmitted to blade 16 causing blade 16 to move from the retracted position to the extended position. Depending on the design of plunger 20, plunger 20 may be designed to be activated by a person's hand or by a person's foot. As blade 16 is moved to the extended position, blade 16 extends from bottom 14 of body 12 and enters ground 30 at an angle to sever the root 32 of weed 28 below ground. Once root 32 is severed, the flow of vital nutrients to the stem 34 and leaves 36 of weed 28 is disrupted and weed 28 dies. Referring to FIG. 4, in the illustrated embodiment, blade 16 has an angled edge 38 to facilitate entry into the ground and cutting of root 32.

Referring to FIGS. 1 and 3, after root 32 is severed, pressure is released from plunger 20, and spring biases blade 16 into the retracted position. With blade 16 in the retracted position, handle 24 can be used to move apparatus 10 to the next weed 28. When the process of weeding is completed, apparatus 10 can be stored with blade 16 in the retracted position so that blade cannot cause inadvertent injury and so that blade 16 is not damaged during storage. Blade 16 is removable for replacement in the event that it does become damaged.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:

1. A weeding apparatus, comprising:

a body having a bottom;

a flat blade angularly positioned within the body at an angle of between 30 degrees and 60 degrees in relation to the bottom of the body, the blade being linearly movable between an extended position and a retracted position, in the extended position the blade protruding at an angle past the bottom of the body; and a foot activated plunger that protrudes from the body in axial alignment with the blade the plunger engaging the blade, such that an axial force exerted upon the plunger is transmitted to the blade causing the blade to move from the retracted to the extended position.

2. The weeding apparatus as defined in claim 1, wherein a spring is provided which biases the blade into the retracted position, such that the biasing force of the spring must be overcome in order to move the blade to the extended position.

3. The weeding apparatus as defined in claim 1, wherein the bottom is planar.

4. The weeding apparatus as defined in claim 1, wherein the blade has an angled cutting edge.

5. A weeding apparatus, comprising:

a body having a planar bottom;

a flat blade angularly positioned within the body at an angle of between 30 degrees and 60 degrees in relation to the bottom of the body, the blade being linearly movable between an extended position and a retracted position, in the extended position the blade protruding at an angle past the bottom of the body;

a spring biasing the blade into the retracted position, such that the biasing force of the spring must be overcome in order to move the blade to the extended position; and a foot activated plunger protruding from the body in axial alignment with the blade for moving the blade from the retracted to the extended position, the plunger engaging the blade, such that an axial force exerted upon the plunger is transmitted to the blade causing the blade to move from the retracted position to the extended position.

6. The weeding apparatus as defined in claim 5, wherein the body has a pointer adapted to facilitate positioning the body relative to a weed, so that the blade will sever a root of the weed when moved to the extended position.

* * * * *

UNITED STATES PATENT AND TRADEMARK OFFICE
CERTIFICATE OF CORRECTION

PATENT NO. : 6,886,642 B2
DATED : May 3, 2005
INVENTOR(S) : Tudor Enache

It is certified that error appears in the above-identified patent and that said Letters Patent is hereby corrected as shown below:

Column 4,
Line 2, "blade the plunger" should read -- blade, the plunger --.

Signed and Sealed this

Thirteenth Day of September, 2005

JON W. DUDAS
*Director of the United States Patent and Trademark Office*